US007099507B2

(12) United States Patent
Ouchi

(10) Patent No.: US 7,099,507 B2
(45) Date of Patent: Aug. 29, 2006

(54) METHOD AND SYSTEM FOR EXTRACTING TITLE FROM DOCUMENT IMAGE

(75) Inventor: Shigeki Ouchi, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/435,373

(22) Filed: Nov. 5, 1999

(65) Prior Publication Data

US 2003/0156754 A1    Aug. 21, 2003

(30) Foreign Application Priority Data

Nov. 5, 1998  (JP)  ................................. 10-328806
Mar. 5, 1999  (JP)  ................................. 11-057973

(51) Int. Cl.
*G06K 9/34*     (2006.01)
(52) U.S. Cl. ........................ 382/173; 382/176; 382/177
(58) Field of Classification Search ........ 382/171–173, 382/175–179, 198, 231, 229, 218, 190
See application file for complete search history.

(56) References Cited

U.S. PATENT DOCUMENTS

| 5,745,600 | A | * | 4/1998 | Chen et al. ................. 382/218 |
| 5,774,580 | A | * | 6/1998 | Saitoh ........................ 382/176 |
| 5,892,843 | A | * | 4/1999 | Zhou et al. ................. 382/176 |
| 5,966,464 | A | | 10/1999 | Kojima ....................... 382/228 |
| 6,035,061 | A | * | 3/2000 | Katsuyama et al. ........ 382/177 |
| 6,137,905 | A | * | 10/2000 | Takaoka ..................... 382/173 |
| 6,173,073 | B1 | * | 1/2001 | Wang ......................... 382/176 |
| 6,226,402 | B1 | * | 5/2001 | Katsuyama ................. 382/171 |
| 6,269,186 | B1 | * | 7/2001 | Makita ....................... 382/172 |
| 6,289,121 | B1 | * | 9/2001 | Abe et al. ................... 382/175 |
| 6,327,387 | B1 | * | 12/2001 | Naoi et al. .................. 382/190 |

FOREIGN PATENT DOCUMENTS

| JP | 5-274471 | 10/1993 |
| JP | 9-134406 | 5/1997 |
| JP | 9-319830 | 12/1997 |

* cited by examiner

*Primary Examiner*—Jingge Wu
*Assistant Examiner*—Brian Le
(74) *Attorney, Agent, or Firm*—Knoble Yoshida& Dunleavy, LLC

(57) ABSTRACT

A title is determined from a document image of an unspecified format based upon likelihood of containing a title in each of minimal circumscribing rectangles. The likelihood is determined based upon information obtained during character recognition of the image contained in the minimal circumscribing rectangles. The information includes a font type, a recognition assurance level, character code and so on.

32 Claims, 15 Drawing Sheets

METHOD AND SYSTEM FOR EXTRACTING TITLE FROM DOCUMENT IMAGE

FIELD OF THE INVENTION

The current invention is generally related to title extraction, and more particularly related to extracting a title area from a document image.

BACKGROUND OF THE INVENTION

In the prior art attempts of extracting a title from documents, one of the significant factors is whether the documents are in a predetermined format. If input documents have a predetermined layout, the position of a title area or a minimal circumscribing rectangle is used to extract information on title. On the other hand, if the input documents are in a free form or do not have a rigid layout, one way is to manually extract a title.

To efficiently extract a title from documents in a free form, Japanese Patent Laid Publication Hei 9-134406 and Japanese Patent Hei 5-274471 disclose prior attempts to use layout features of the documents. Japanese Patent Hei 5-274471 discloses a priority scheme in selecting a title-containing area. The priority scheme includes (1) an area's relative closeness to the upper left corner in a document image, (2) a number of characters contained in an adjacent area, and (3) a number of characters in the area and the adjacent area. The above priority is determined by using minimal circumscribing rectangles, and no character recognition is performed. Japanese Patent Laid Publication Hei 9-134406 discloses a selection of a title based upon a projection histogram of a document image. Regions of the projection histogram are compared to a pair of predetermined threshold values to determine a title area. Although the above prior attempts provide some success in determining a title in documents, the accuracy still remains a problem.

SUMMARY OF THE INVENTION

In order to solve the above and other problems, according to a first aspect of the current invention, a method of determining a title from a document image, including: dividing the document image into minimal circumscribing rectangles which contain a character image; recognizing characters in the minimal circumscribing rectangles; and determining a title of the document image based upon a likelihood of each of the minimal circumscribing rectangles containing a title, the likelihood being determined by a summation of points obtained during the character recognition and the title determination, the summation of the points being determined based upon natural language likelihood and any combination of character row area coordinates, character type, number of characters, character code assurance, character minimum circumscribing rectangle coordinates, and character minimum circumscribing rectangle size, the natural language likelihood being determined based upon a comparison to a predetermined title dictionary.

According to a second aspect of the current invention, a system for determining a title from a document image, including: a character row area determination unit for dividing the document image into minimal circumscribing rectangles which contain a character image; a character recognition unit connected to the character row area determination unit for recognizing characters in the minimal circumscribing rectangles; and a title evaluation point determination unit connected to the character recognition unit for determining a title of the document image based upon a likelihood of each of the minimal circumscribing rectangles containing a title, the likelihood being determined by a summation of points obtained during the character recognition and the title evaluation, the summation of the points being determined based upon natural language likelihood and any combination of character row area coordinates, character type, number of characters, character code assurance, character minimum circumscribing rectangle coordinates, and character minimum circumscribing rectangle size, the natural language likelihood being determined based upon a comparison to a predetermined title dictionary.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
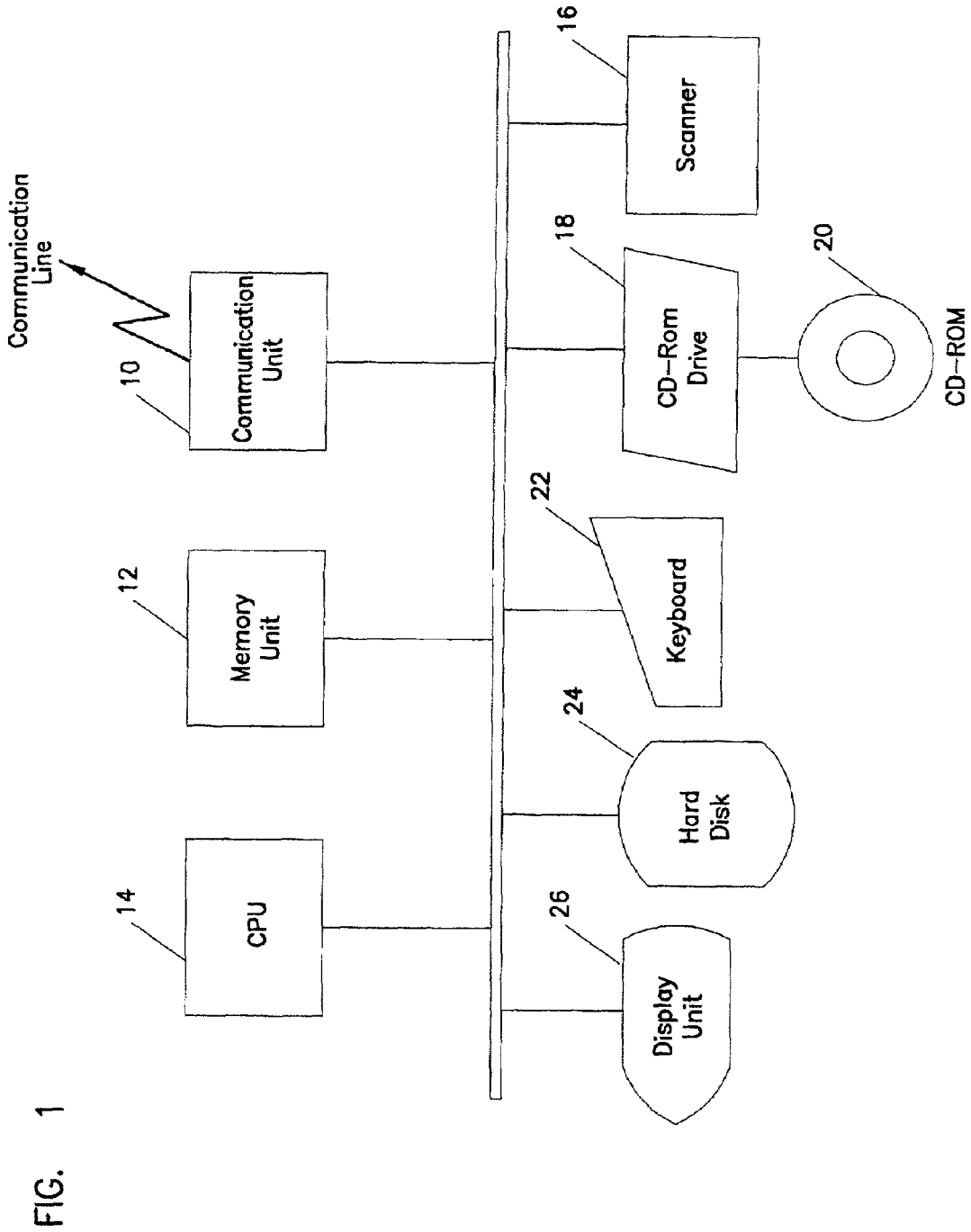
FIG. 1 is a block diagram illustrating one preferred embodiment of the system for extracting a title from a document image according to the current invention.

Referring now to the drawings, wherein like reference numerals designate corresponding structure throughout the views, and referring in particular to FIG. 1, one preferred embodiment of the system for extracting a title from a document image according to the current invention is implemented in a computer network. The system is connected to a communication line via a communication unit 10 and includes a central processing unit (CPU) 14 along with a memory unit 12. Software or computer instructions for extracting a title is stored in a storage device such as a hard disk 24 or a read only memory compact disk (CD-ROM) 20. The title extracting software is copied into the memory unit 12, and the CPU 14 executes the computer instructions. The document image is inputted into the system via an input device such as a scanner 16 or via the communication line. Alternatively, the document image is inputted from the above described storage media. The system communicates with a system user via a keyboard 22 and a display unit 26.

Still referring to FIG. 1, the title extraction software is initiated by the user to automatically select a title in a specified input document. In general, the title extraction software according to the current invention divides the input image into minimal circumscribing rectangles, and each of the minimal circumscribing rectangles contains a continuous image portion. The image portion in each minimal circumscribing rectangle is converted to a character code based upon a known optical character recognition method. During the character recognition, certain predetermined information is stored. A title area is determined based upon a likelihood of a minimal circumscribing rectangle containing a title. The likelihood is determined based upon the predetermined information obtained during the character recognition process and is expressed as a sum of points indicating the likelihood.

Figure 2:
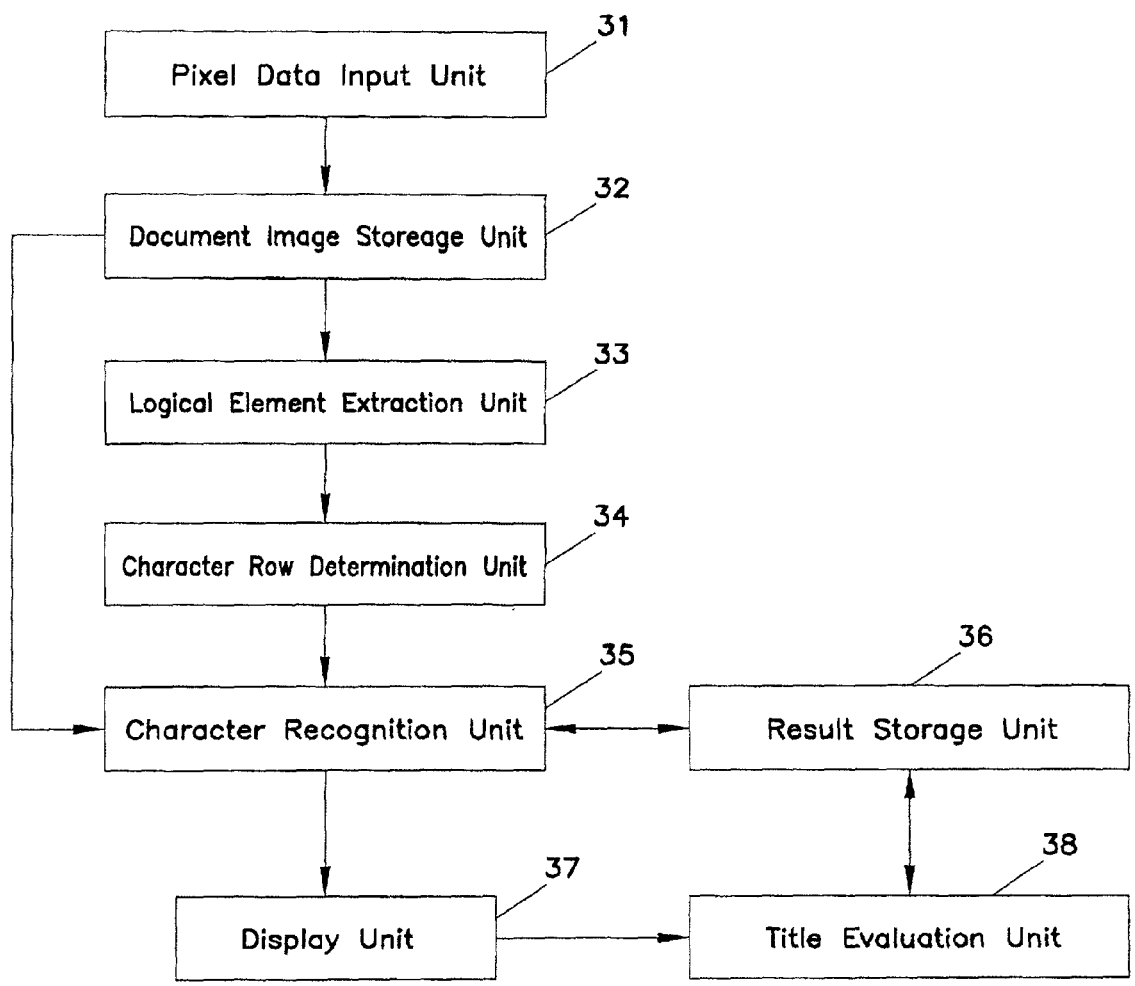
FIG. 2 is a block diagram illustrating a second preferred embodiment of the system for determining a title from a document image according to the current invention.

Now referring to FIG. 2, a block diagram illustrates a second preferred embodiment of the system for determining a title from a document image according to the current invention. A pixel data input unit 31 inputs a document image, and a document image storage unit 32 stores the inputted document image. After a logical element extraction unit 33 extracts logical elements, a character row determination unit 34 confirms the extracted elements are indeed character rows areas. A character recognition unit 35 recognizes characters from an image contained in the confirmed character rows areas. Information obtained from the character recognition in the character recognition unit 35 is outputted to a result storage unit 36. A title evaluation unit 38 determines a title based upon the stored information in the result storage unit 36. The title evaluation unit 38 uses the stored information such as a character recognition assurance level as a factor in determining a title area. The result of the title determination is displayed in a display unit 37.

Figure 3:
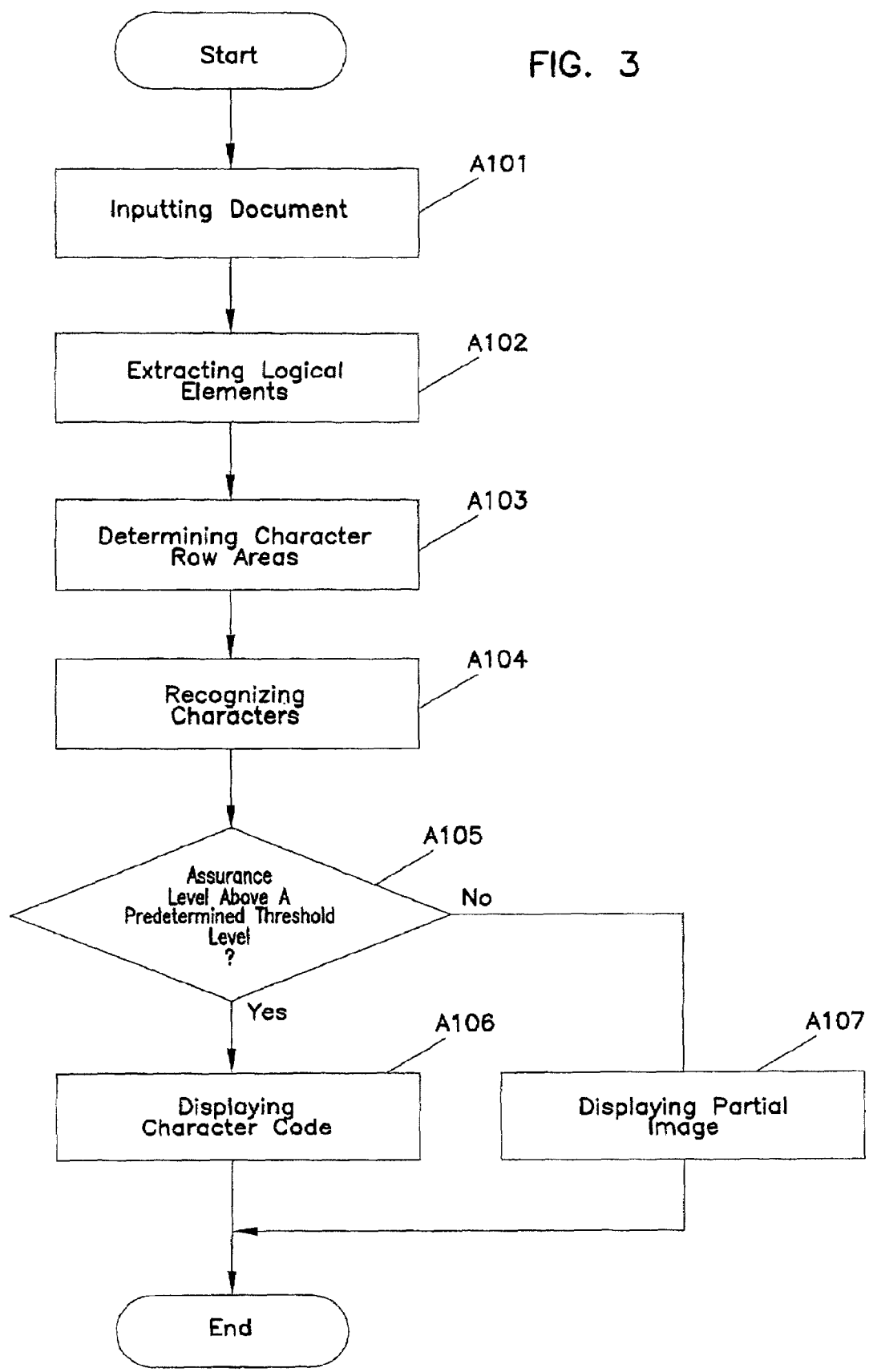
FIG. 3 is a flow chart illustrating acts involved in a preferred process of determining a factor in selecting a title according to the current invention.

Referring to FIG. 3, a flow chart illustrates acts involved in a preferred process of determining a factor in selecting a title according to the current invention. Some elements of FIG. 2 perform the following acts. In act A101, a document image is inputted. Logical elements are extracted from the inputted document image in act A102. The logical elements are determined based upon layout characteristics of the inputted document using a conventional method. The logical elements include a title area, an author name area and so on. Based upon the logical elements, character row areas are determined in act A103. Then, the character row areas are processed for character recognition in act A104. In the act A104, the character recognition unit 35 determines not only coordinates and a character code of each character image portion in the character row area, but also a recognition assurance level of the character recognition. In act A105, it is determined whether or not the character recognition assurance level is above a predetermined threshold value. If the assurance level is higher than the predetermined threshold value, the recognized data or information is stored in the result storage unit 36 for the future processing and displayed as a character code. On the other hand, if the assurance level is below the predetermined threshold value, the image portion is considered as an image rather than a character and the image is displayed in act A107.

Figure 4:
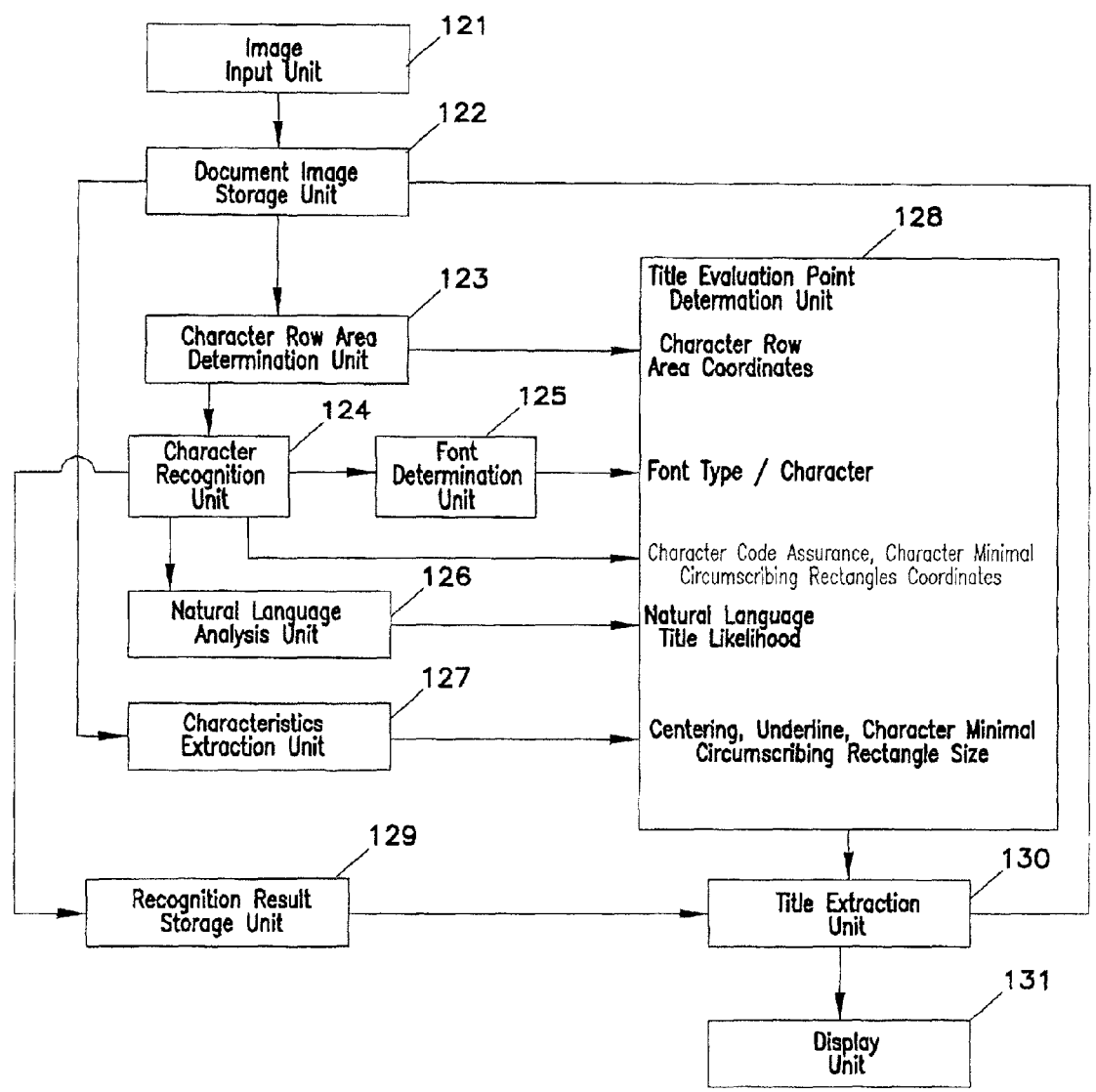
FIG. 4 is a block diagram illustrating a third preferred embodiment of the system for determining a title from a document image according to the current invention.

Now referring to FIG. 4, a block diagram illustrates a third preferred embodiment of the system for determining a title from a document image according to the current invention. An image input unit 121 inputs a document image, and a document image storage unit 122 stores the inputted document image. A character row area determination unit 123 determines areas or minimal circumscribing rectangles that contain characters. The character row area determination unit 123 outputs the coordinates as well as the size of character row areas to a character recognition unit 124 as well as a title evaluation point determination unit 128. The character recognition unit 124 recognizes characters from character image portions in the character row areas. A reference describing character recognition, U.S. Pat. No. 5,966,464 is incorporated by reference herein in its entirety. The character recognition unit 124 generates corresponding character codes as well as other associated information. Other associated information includes the character recognition assurance level, the coordinates of a minimal circumscribing rectangle and the size of the rectangle. The outputs from the character recognition unit 124 are sent to a font determination unit 125, the title evaluation point determination unit 128, a natural language analysis unit 126 and a recognition result storage unit 129. The font determination unit 125 determines a font type and other associated information for each character and outputs the font information to the title evaluation point determination unit 128. A reference describing font determination, Japanese Patent Laid Publication Hei 9-319830 is incorporated by reference herein in its entirety. The natural language analysis unit 126 compares the recognized characters against a predetermined dictionary and determines whether or not the recognized characters match or resemble any of the predetermined titles or words in a dictionary. For example, the dictionary contains a set of predetermined suffixes which indicate a noun form and its corresponding statistical information. The natural language analysis unit 126 also outputs the determination information to the title evaluation point determination 128. A characteristics extraction unit 127 extracts information on certain layouts such as underlining, centering and the minimal circumscribing rectangle size from the input image and outputs the information to the title evaluation point determination unit 128. For example, if the character size is beyond 18-point in an A4 image, the minimal circumscribing rectangle containing the characters is assigned a high score. Similarly, a high score is assigned to a minimal circumscribing rectangle if a number of characters or words in the rectangle is less than a predetermined number. For example, for the Japanese language, the predetermined number of characters may be set to twelve. The above and other predetermined numbers are user-definable.

Based upon the information received from the above described units, the title evaluation point determination unit 128 determines the likelihood of containing a title for each minimal circumscribing rectangle and expresses the likelihood in terms of a sum of points. For example, a higher number of points is generally given to a large size character set since a title is usually larger than text. Similarly, a higher number of points is generally given for a character set that is underlined or otherwise emphasized. A higher point is assigned to the natural language determination information indicating a title row such as "title:" or "re:." The points are optionally weighted for each category of information. Any combination of categories of the above described information is also optionally used to determined the likelihood. The title evaluation point determination unit 128 determines whether the largest sum is above a predetermined threshold value to qualify an area corresponding to the largest sum of points as a title area. A title extraction unit 130 extracts the qualified title while a display unit 131 displays the extracted title.

Figure 5:
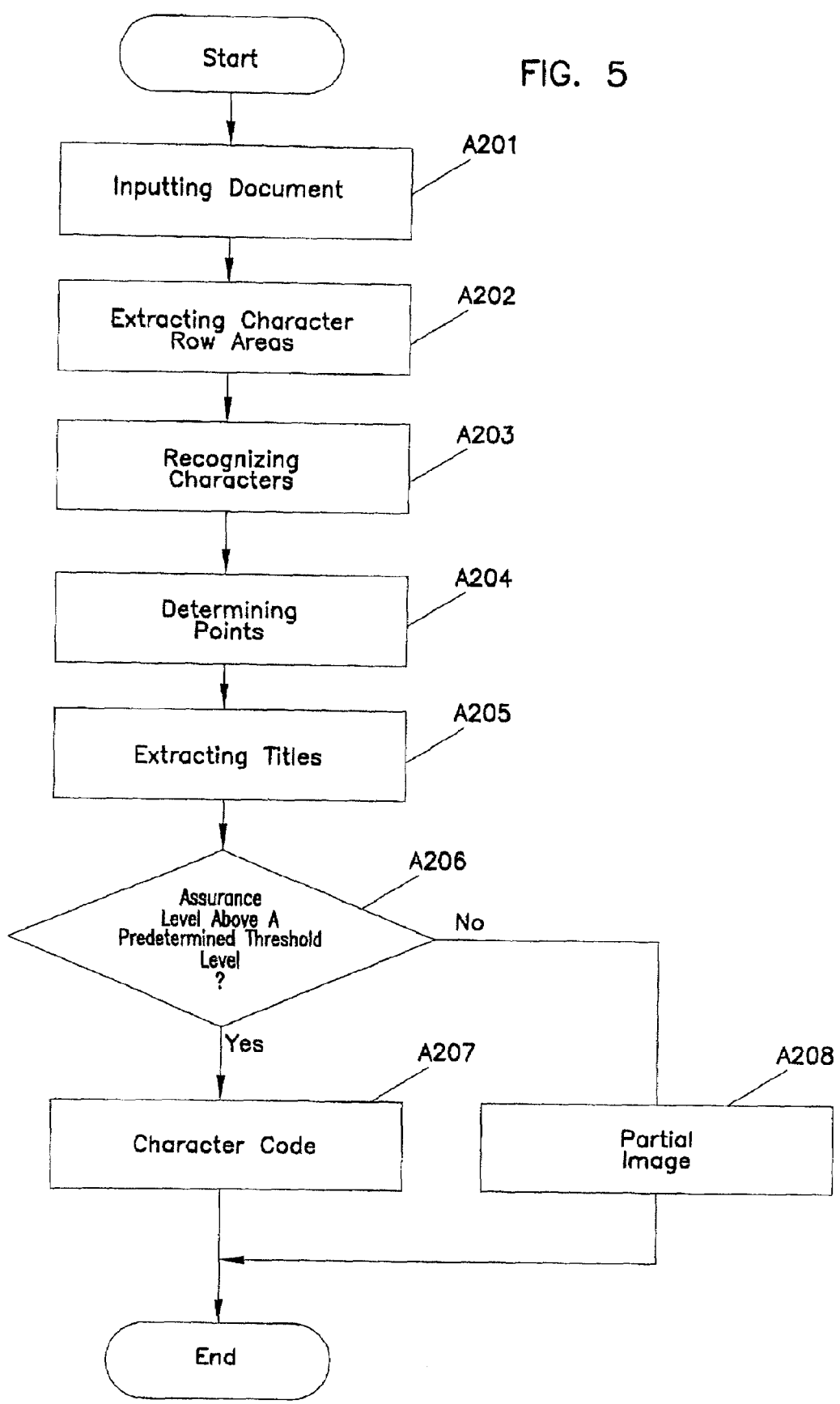
FIG. 5 is a flow chart illustrating acts involved in a second preferred process of determining a title from a document image according to the current invention.

Referring to FIG. 5, a flow chart illustrates acts involved in a second preferred process of determining a title from a document image according to the current invention. Some of the elements described in FIG. 4 illustrate the following acts in the preferred process. An image input unit 121 inputs a document image in act A201. A character row area determination unit 123 determines areas or minimal circumscribing rectangles that contain characters in act A202. The character recognition unit 124 recognizes characters from character image portions in the character row areas in act A203. The character recognition unit 124 generates corresponding character codes as well as other associated information. Other associated information includes the character recognition assurance level, the coordinates of a minimal circumscribing rectangle and the size of the rectangle. The outputs from the character recognition unit 124 are sent to a font determination unit 125, the title evaluation point determination unit 128, a natural language analysis unit 126 and a recognition result storage unit 129. These units use the information obtained from the character recognition act and further process it. The process information is sent to the title evaluation point determination unit 128. Based upon the processed information received from the above described units, the title evaluation point determination unit 128 determines the likelihood of containing a title for each minimal circumscribing rectangle and expresses the likelihood in terms of a sum of points in act A204. Based upon the likelihood, the title extraction unit 130 extracts a qualified title in act A205. In act A206, the character recognition assurance level is compared to a predetermined threshold value. If the assurance level is above the predetermined threshold value, the character code is displayed as a title in act A207. On the other hand, if the assurance level is below the predetermined threshold value, a partial image is displayed in act A208.

Figure 6:
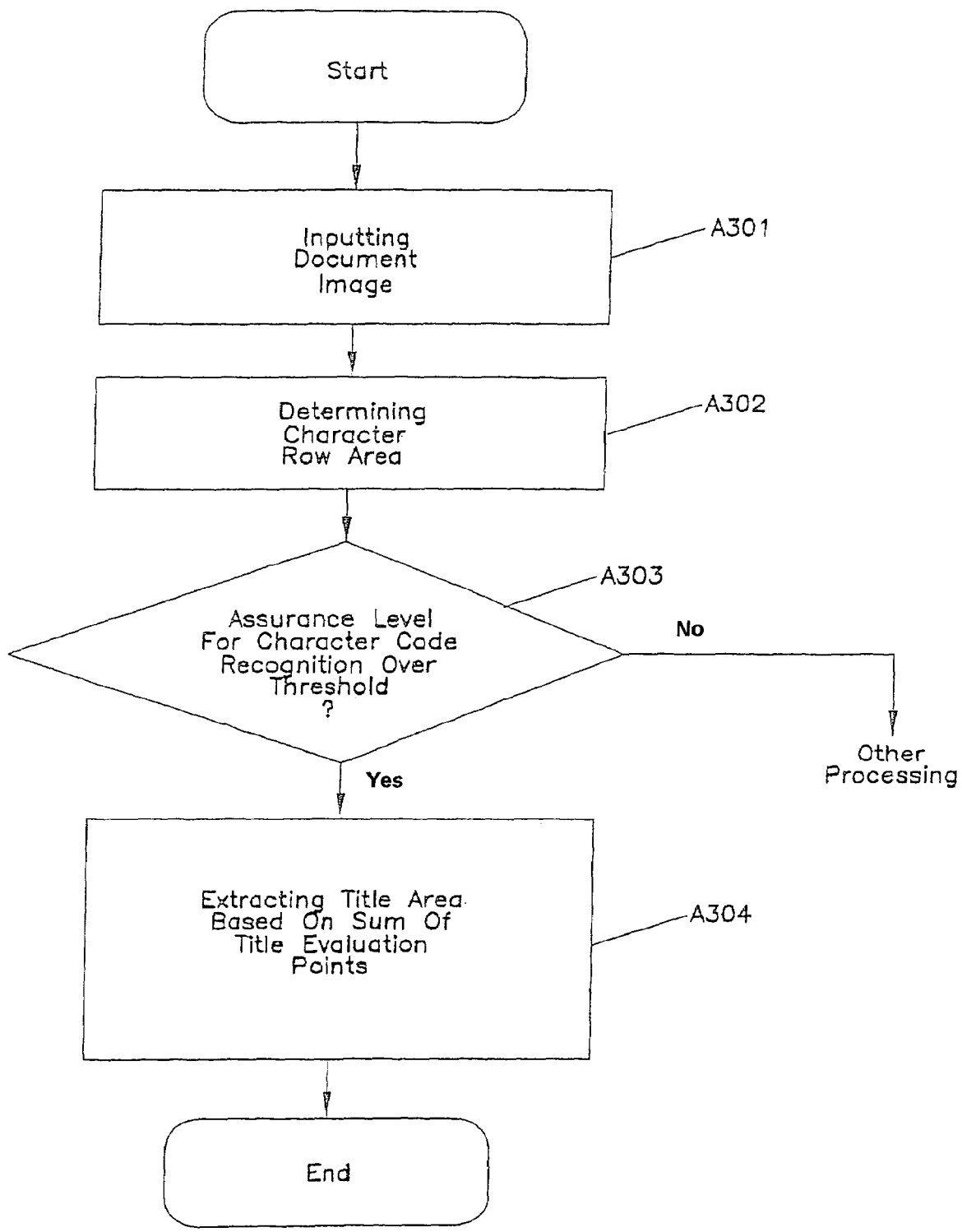
FIG. 6 is a flow chart illustrating acts involved in determining the likelihood based upon a character recognition assurance level according to the current invention.

FIGS. 6 through 11 illustrate acts involved in preferred processes of determining a title according to the current invention. Any combination of these processes is performed by the elements of FIG. 5. FIG. 6 illustrates acts involved in determining the likelihood based upon a character recognition assurance level according to the current invention. In act A301, a document image is inputted, and character row areas are determined in act A302. After the character image in the character row areas is converted into character codes, a character recognition assurance level is compared to a predetermined threshold value in act A303. If the assurance level is above the predetermined threshold value, a predetermined number of points is added to the likelihood for the character row area and a title area selection is determined based upon the total number of points in act A304. On the other hand, if the assurance level is below the predetermined threshold value, other predetermined processing is performed.

Figure 7:
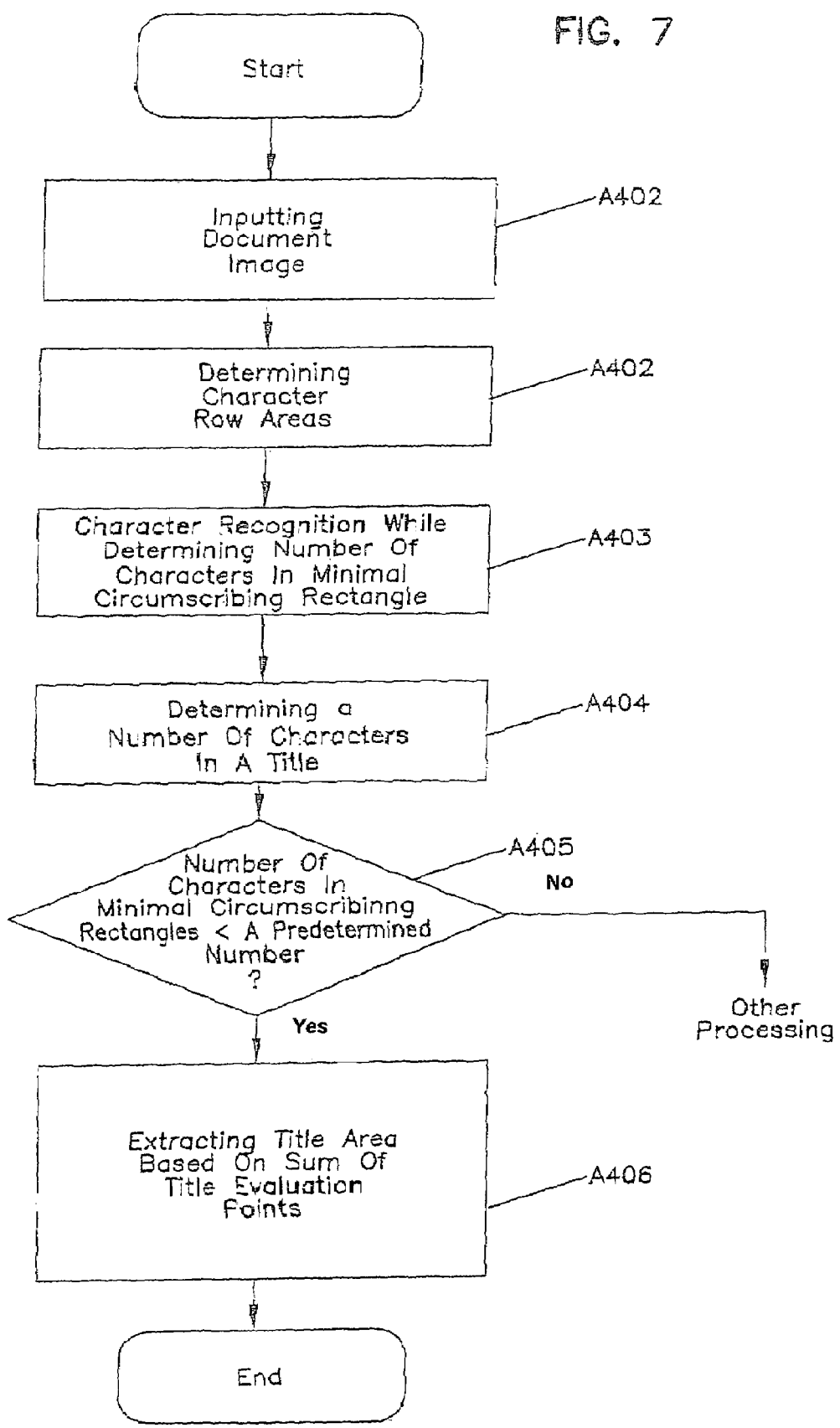
FIG. 7 is a flow chart illustrating other acts involved in determining the likelihood based upon a number of characters according to the current invention.

FIG. 7 illustrates other acts involved in determining the likelihood based upon a number of characters according to the current invention. In act A401, a document image is inputted, and character row areas are determined in act A402. After the character image in the character row areas is converted into character codes, a number of characters is determined. The number of characters is compared to a predetermined threshold value in act A404. A set of predetermined threshold values is optionally stored in a statistical dictionary for different types of documents. If the number of characters is below the predetermined threshold value in act A405, a predetermined number of points is added to the likelihood for the character row area and a title area selection is determined based upon the total number of points in act A406. On the other hand, if the number of characters is above the predetermined threshold value in act A405, other predetermined processing is performed.

Figure 8:
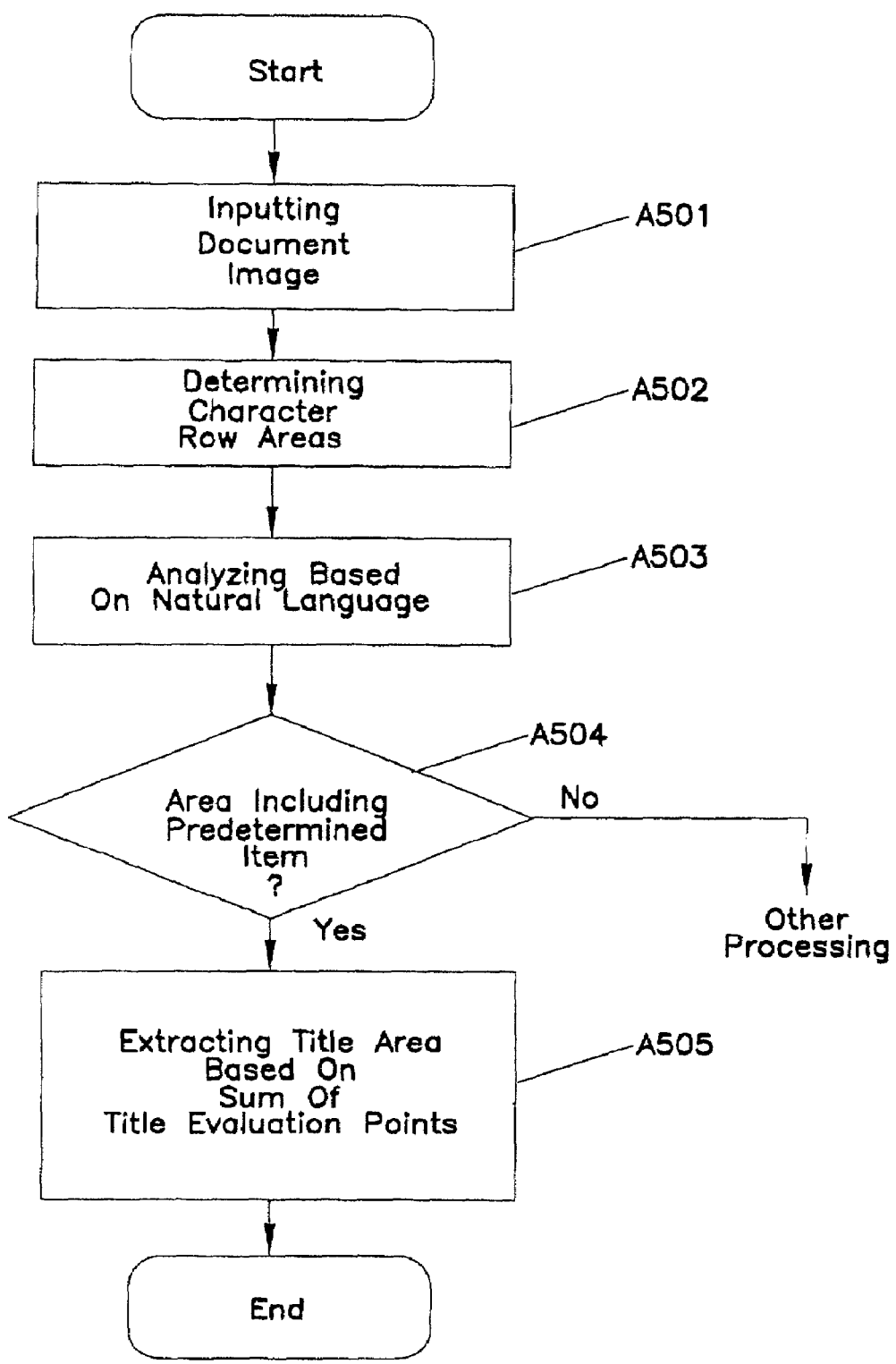
FIG. 8 is a flow chart illustrating other acts involved in determining the likelihood based upon a predetermined word according to the current invention.

FIG. 8 illustrates other acts involved in determining the likelihood based upon a predetermined word according to the current invention. In act A501, a document image is inputted, and character row areas are determined in act A502. After the character image in the character row areas is converted into character codes, a predetermined natural language process is performed in act A503. For example, it is determined whether or not the converted character set or word ends in a noun form. A set of predetermined noun forms or suffixes is optionally stored in a form dictionary. If the word satisfies a predetermined condition in act A504, a predetermined number of points is added to the likelihood for the character row area and a title area selection is determined based upon the total number of points in act A505. On the other hand, if the predetermined condition is not met in act A504, other predetermined processing is performed.

Figure 9:
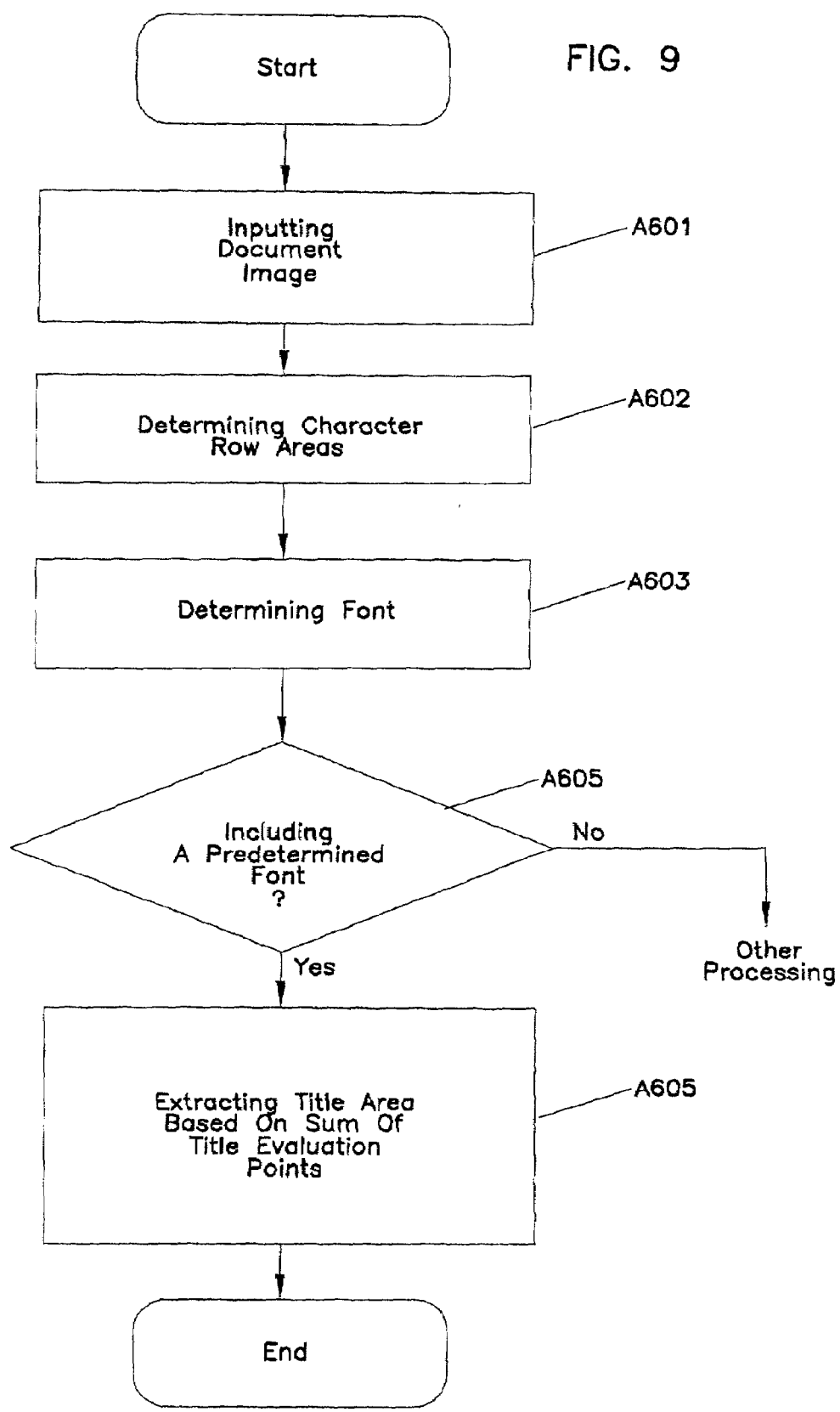
FIG. 9 is a flow chart illustrating acts involved in determining the likelihood based upon font information according to the current invention.

FIG. 9 illustrates acts involved in determining the likelihood based upon font information according to the current invention. In act A601, a document image is inputted, and character row areas are determined in act A602. After the character image in the character row areas is converted into character codes, font information such as a font style is extracted in act A603. The font information is compared to a predetermined font data in act A604. If the font information matches the predetermined font data, a predetermined number of points is added to the likelihood for the character row area and a title area selection is determined based upon the total number of points in act A605. On the other hand, if the font information fails to match the predetermined font data, other predetermined processing is performed. Alternatively, font style distribution data is generated for an input document. Based upon an occurrence frequency in the font style distribution, it is determined whether or not the character row contains a title.

Figure 10:
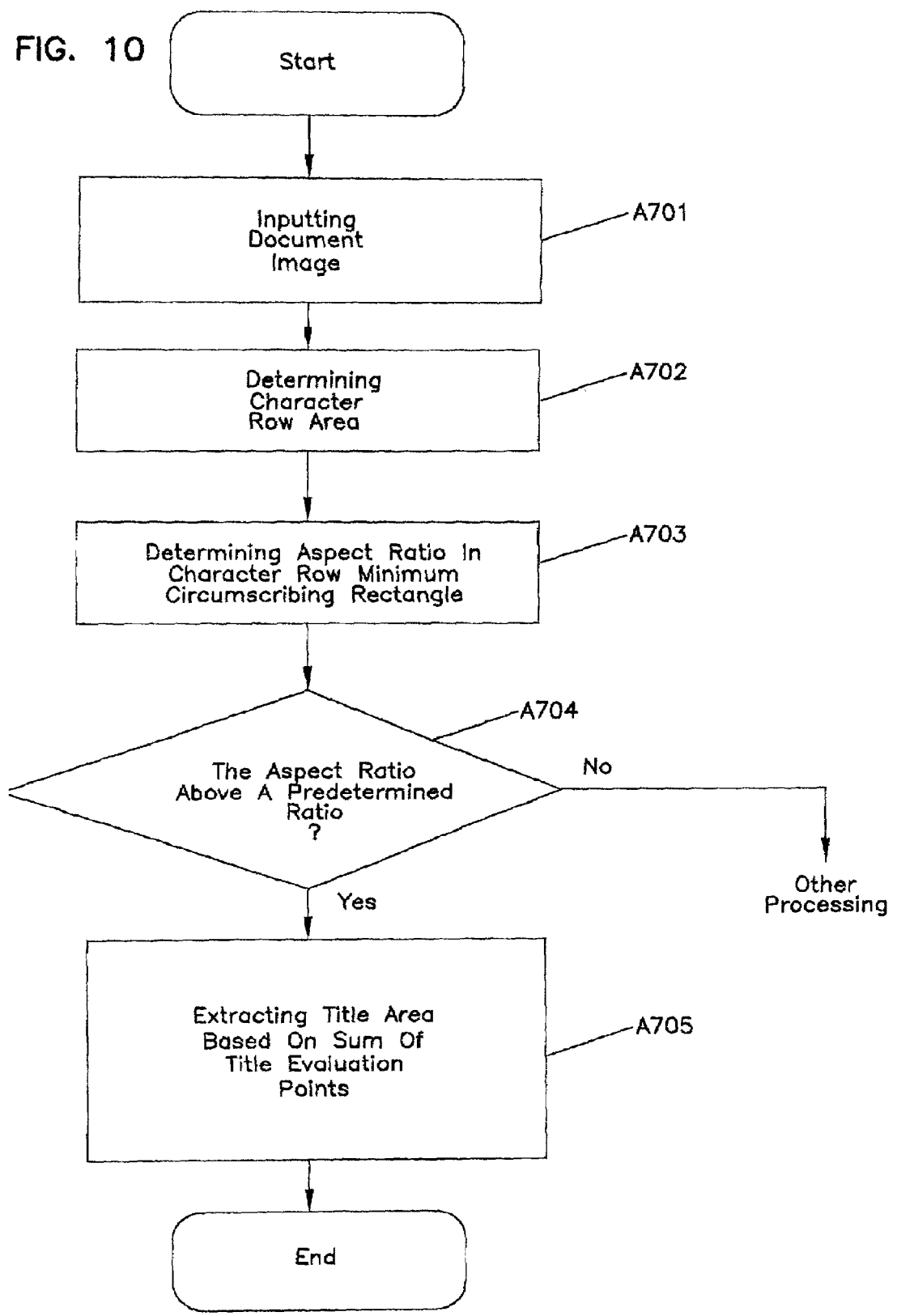
FIG. 10 is a flow chart illustrating acts involved in determining the likelihood based upon a length-height ratio according to the current invention.

FIG. 10 illustrates acts involved in determining the likelihood based upon a length-height ratio according to the current invention. In act A701, a document image is inputted, and character row areas are determined in act A702. After the character image in the character row areas is converted into character codes, the width-height ratio of a minimal circumscribing rectangle containing the characters is determined in act A703. The ratio is then compared to a predetermined threshold value in act A704. If the ratio is above the predetermined threshold value, a predetermined number of points is added to the likelihood for the character row area and a title area selection is determined based upon the total number of points in act A705. For example, the width-height ratio of 2:1 is used as a predetermined threshold value. On the other hand, if the ratio is below the predetermined threshold value, other predetermined processing is performed.

Figure 11:
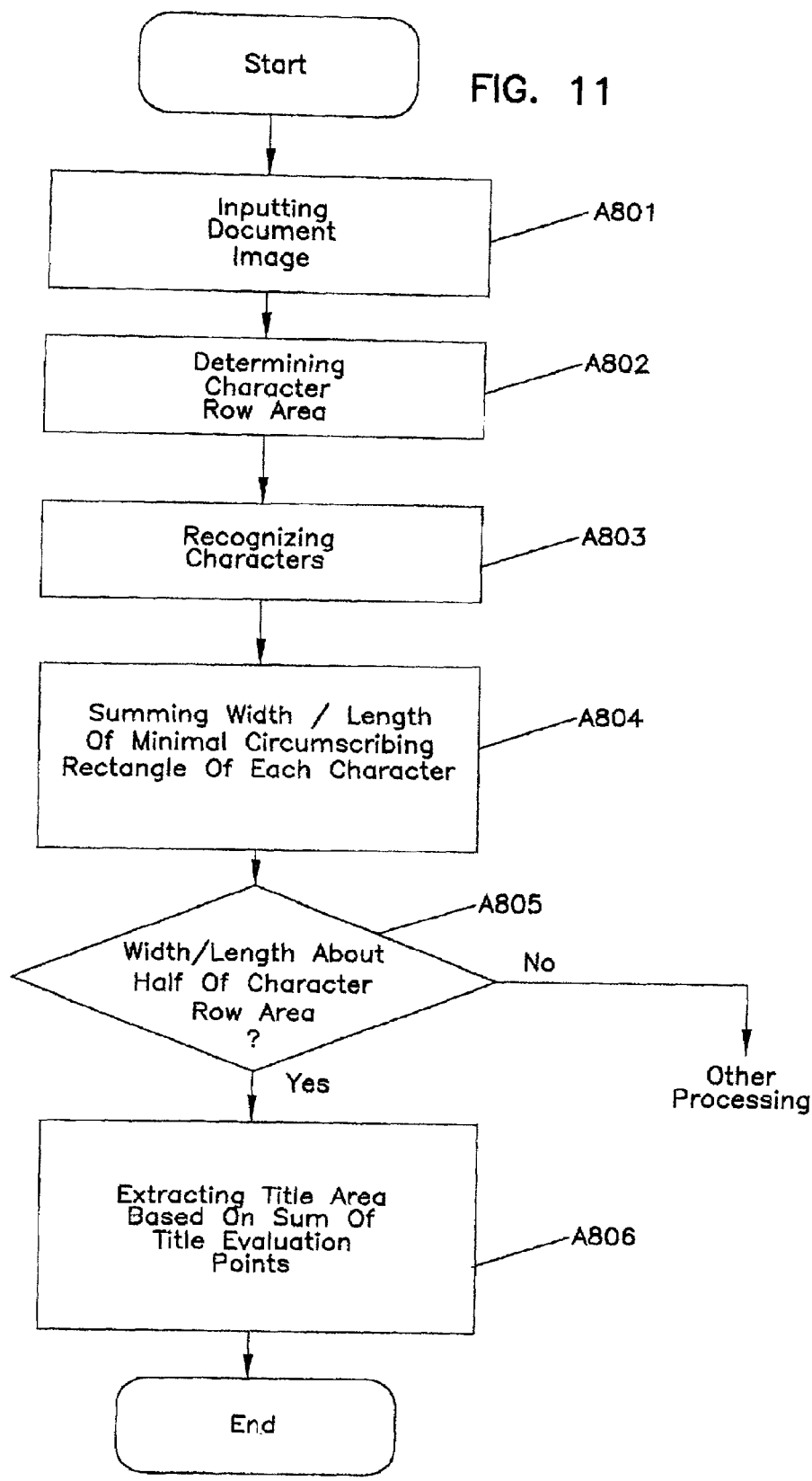
FIG. 11 is a flow chart illustrating acts involved in determining the likelihood based upon a total character width according to the current invention.

FIG. 11 illustrates acts involved in determining the likelihood based upon a total character width according to the current invention. In act A801, a document image is inputted, and character row areas are determined in act A802. After the character image in the character row areas is converted into character codes in act A803, a total character width is determined by adding a width of each character in a minimal circumscribing rectangle in act A804. The total character width is compared to the width of the minimal circumscribing rectangle in act A805. If the total character width is approximately one half of the minimal circumscribing rectangular width, a predetermined number of points is added to the likelihood for the character row area and a title area selection is determined based upon the total number of points in act A806. On the other hand, if the total character width is not approximately one half of the minimal circumscribing rectangular width, other predetermined processing is performed. Alternatively, when characters are arranged in a top-to-bottom vertical manner rather than a left-to-right horizontal manner, a total height of the characters is compared to a minimal circumscribing rectangular height.

Figure 12:
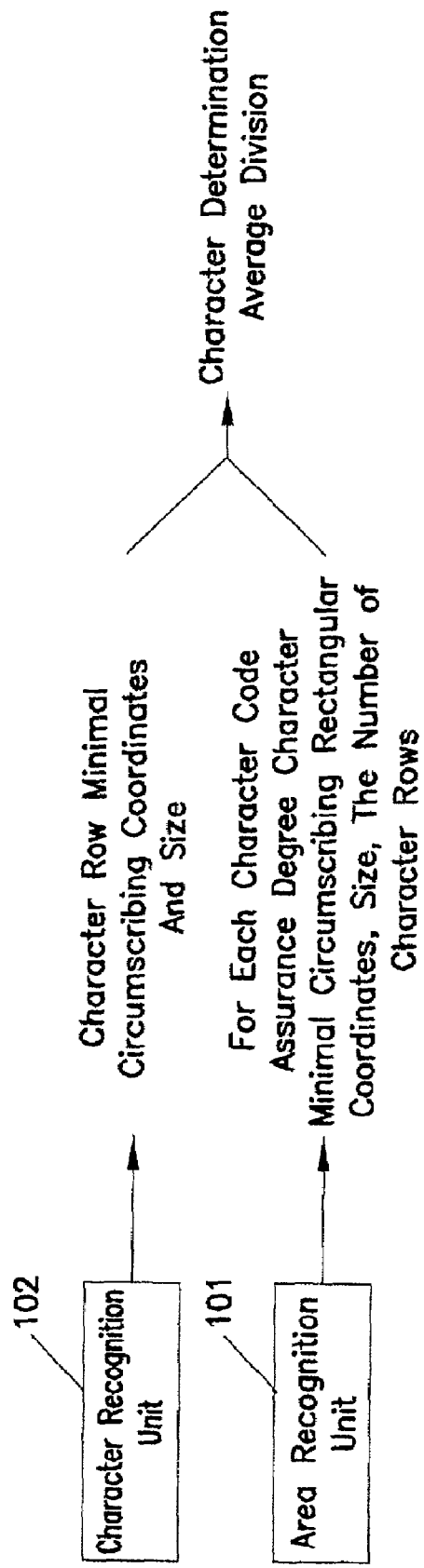
FIG. 12 is a block diagram illustrating a fourth preferred embodiment of the system for determining a factor in selecting a title from a document image according to the current invention.

Now referring to FIG. 12, a block diagram illustrates a fourth preferred embodiment of the system for determining a factor in selecting a title from a document image according to the current invention. A character recognition unit 102 recognizes characters from character images and generates character codes. The character recognition unit 102 also outputs the character circumscribing rectangular coordinates and size. An area recognition unit 101 determines a character density level based upon a number of characters and the minimal circumscribing rectangular size. Based upon the character density and the character size, it is determined whether or not the equal character spacing exists in a particular minimal circumscribing rectangle. The area recognition unit 101 also determines whether or not the characters are proportionally enlarged from the rest of the text based upon a length-and-height ratio of minimal circumscribing rectangles. These determined features generally contribute to a title, and a predetermined number of points is allocated for these features.

Figure 13:
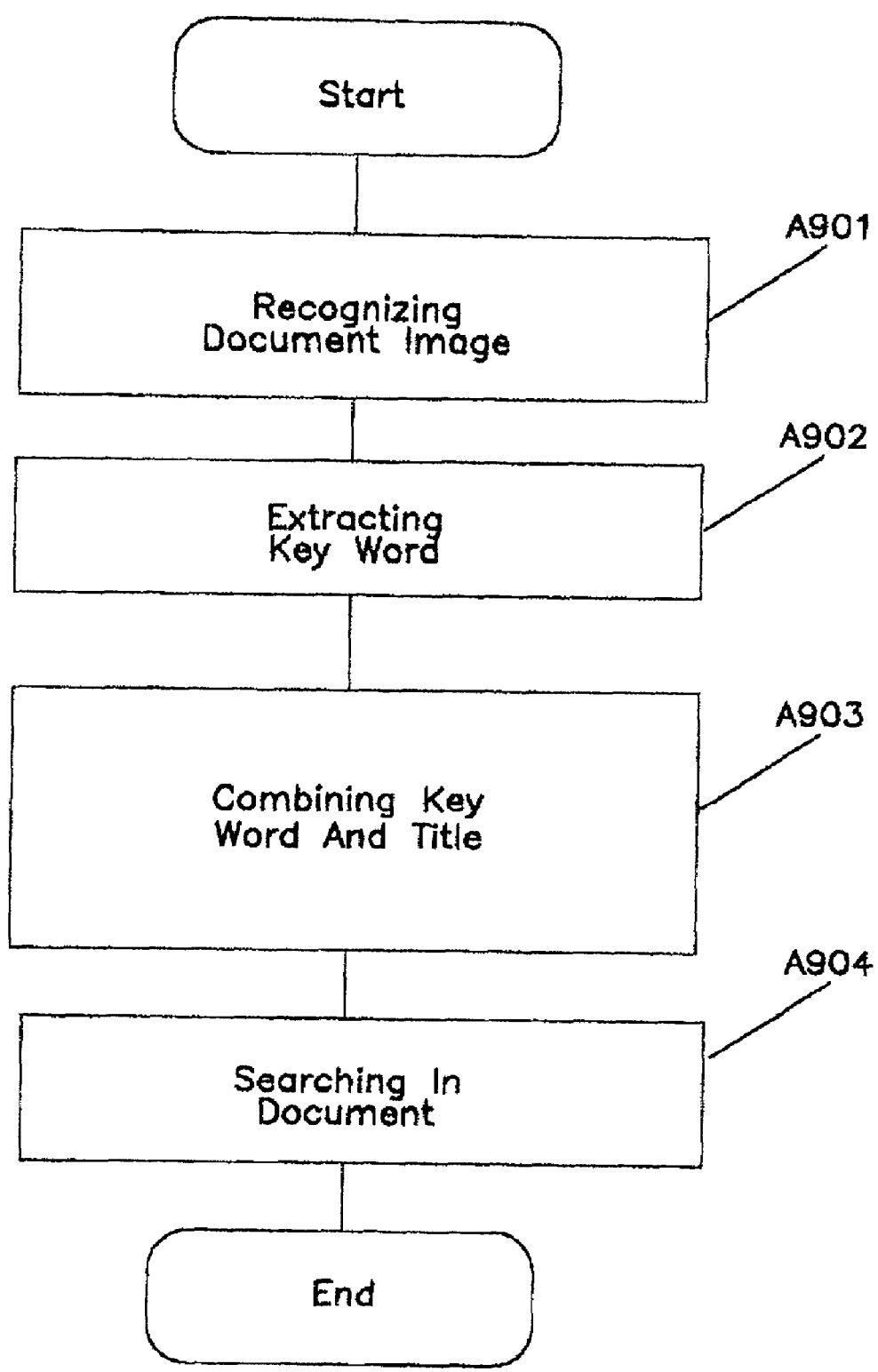
FIG. 13 is a flow chart illustrating acts involved in determining a search word according to the current invention.

FIG. 13 illustrates acts involved in determining a search word according to the current invention. In act A901, each character image in a document image is converted into a character code. A key word is selected from the document according to a predetermined natural language technique in act A902. The key word is combined with a title in act A903. Using the combined search word, the document is searched for a match in act A904. This is one example of the use of the title which is extracted according to the current invention.

Figure 14:
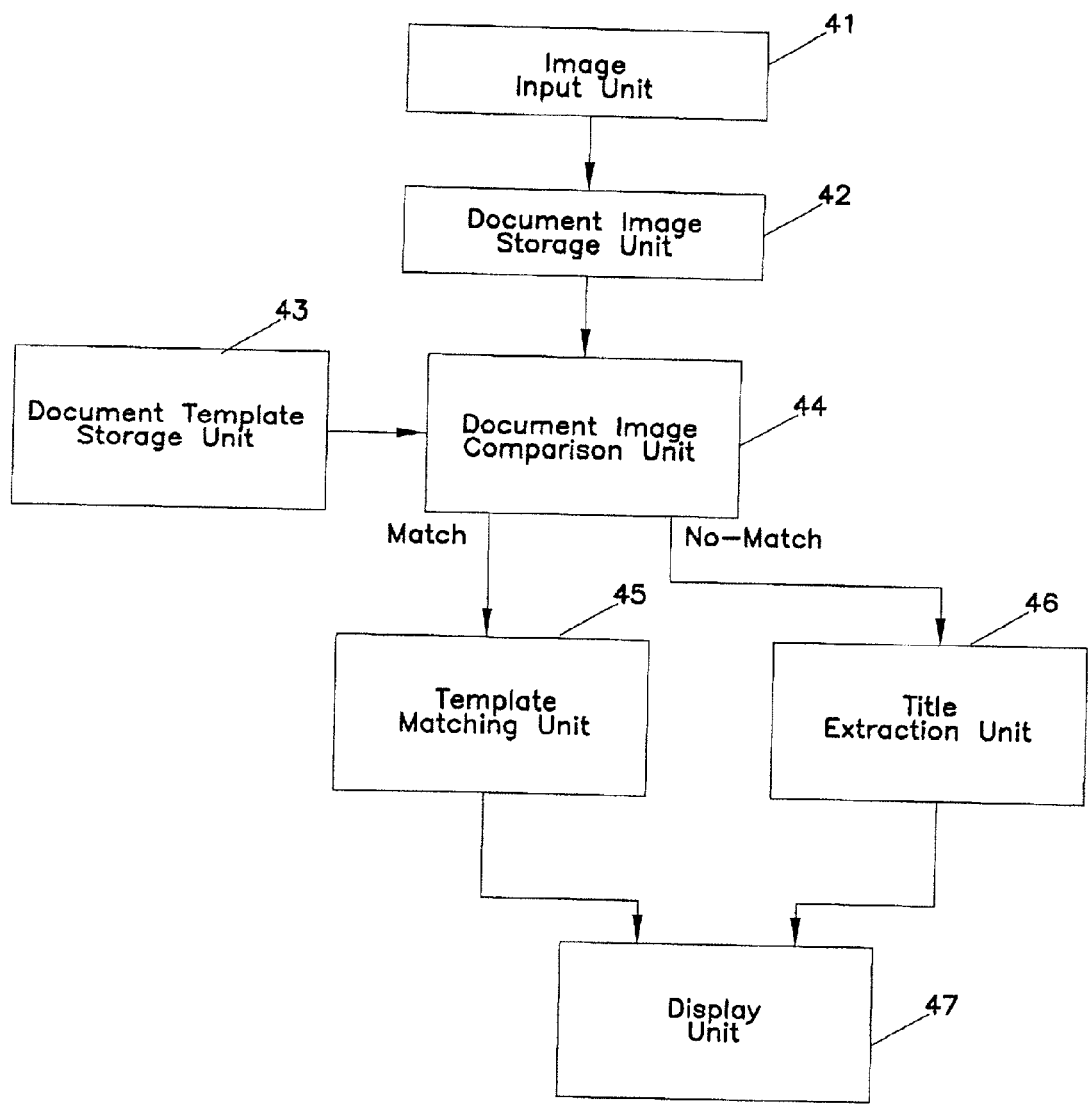
FIG. 14 is a block diagram illustrating a fifth preferred embodiment of the system for pre-processing a document image prior to selecting a title from a document image according to the current invention.

Now referring to FIG. 14, a block diagram illustrates a fifth preferred embodiment of the system for pre-processing a document image prior to selecting a title from a document image according to the current invention. The fifth preferred embodiment includes an image input unit 41 for inputting a document image and a document image storage unit 42 for storing the inputted document image. A document image comparison unit 44 compares the inputted documented image to a predetermined set of templates which are stored in a document template storage unit 43. The predetermined document templates have coordinates of certain portions including a title area. If the inputted document matches one of the templates, a template matching unit 45 extracts a title area according to the information of the matched template. On the other hand, if the inputted document fails to match any of the predetermined templates, a title extraction unit 46 selects a title area according to the current invention. Preferred embodiments of the title extraction unit 46 have been already described above. Lastly, a display unit 47 displays the result of the title determination either by the template matching unit 45 or the title extraction unit 46.

Figure 15:
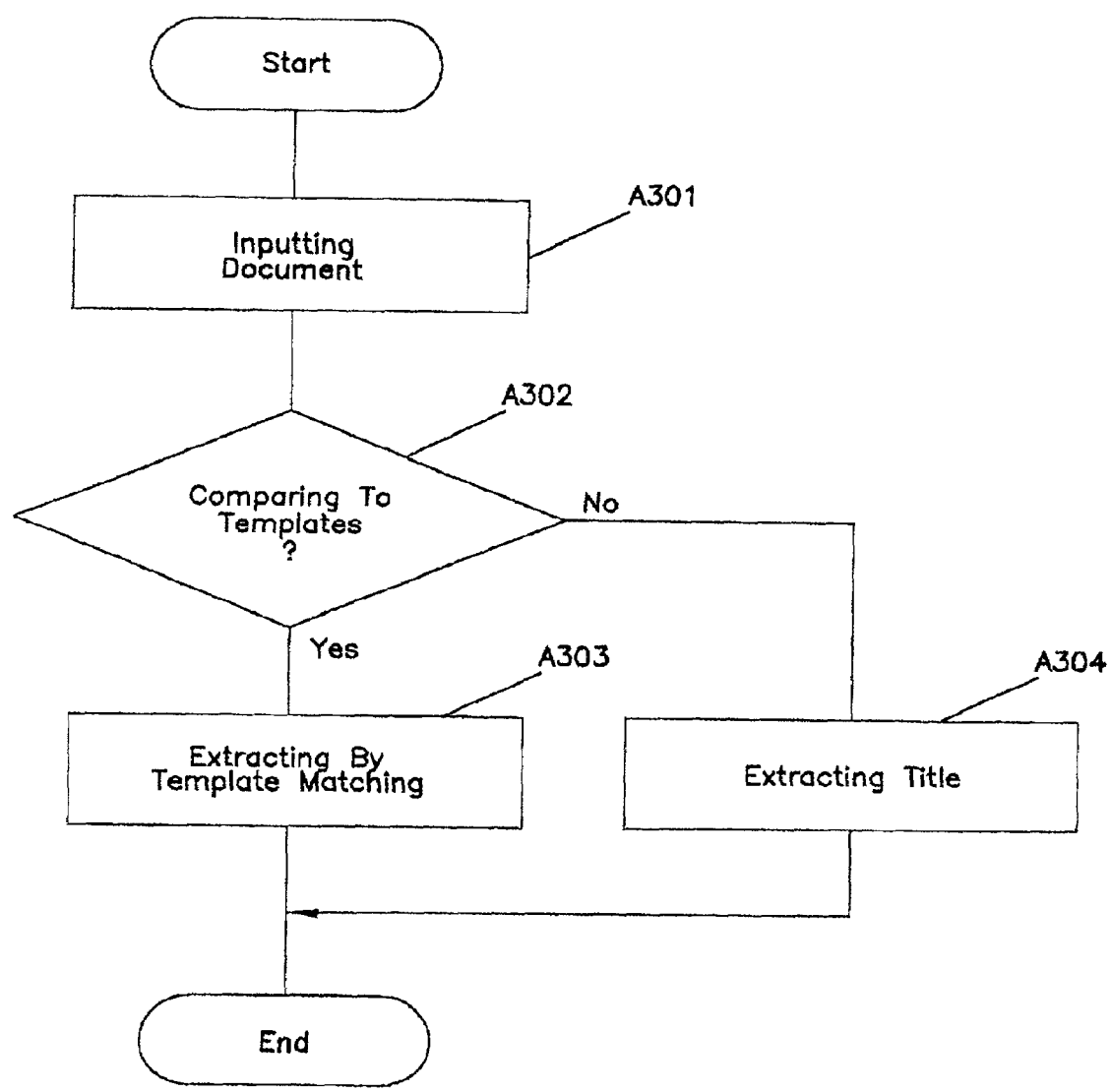
FIG. 15 is a flow chart illustrating acts involved in pre-processing a document image prior to selecting a title from a document image according to the current invention.

FIG. 15 illustrates acts involved in pre-processing a document image prior to selecting a title from a document image according to the current invention. In act A301, a document image is inputted, and the document image is stored. In act A302, it is determined whether or not the inputted document matches any of predetermined document templates. The predetermined document templates have coordinates of certain portions including a title area. If the inputted document matches a template, a title area of the inputted document is extracted according to the matched template in act A303. On the other hand, if none of the predetermined templates matches the inputted document image, a title area is extracted according to the current invention. The title extraction according to the current invention has been described in the above described preferred processes.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of determining a title from a document image, comprising:
    dividing the document image into minimal circumscribing rectangles which contain a character image;
    recognizing characters in said minimal circumscribing rectangles; and
    determining a title of the document image based upon a likelihood of each of said minimal circumscribing rectangles containing a title, said likelihood being determined by a summation of points obtained during said character recognition and said title determination, the summation of the points being determined based upon natural language likelihood and any combination of character row coordinates, character type, number of characters, character code assurance, character minimum circumscribing rectangle coordinates, and character minimum circumscribing rectangle size, the natural language likelihood being determined based upon a comparison to a predetermined title dictionary.

2. The method of determining a title from a document image according to claim 1 wherein the summation of the points is further determined based upon characteristics on font.

3. The method of determining a title from a document image according to claim 2 wherein said font characteristics include a frequency of a particular font type.

4. The method of determining a title from a document image according to claim 1 wherein said character recognition further includes an act of matching said characters with a set of predetermined words, said predetermined words indicating said title.

5. The method of determining a title from a document image according to claim 4 wherein the summation of the points is further determined based upon a result of said matching with said predetermined words.

6. The method of determining a title from a document image according to claim 1 wherein said number of said characters is compared to a predetermined maximal threshold number.

7. The method of determining a title from a document image according to claim 1 wherein the summation of the points is further determined based upon an assurance level of said character recognition.

8. The method of determining a title from a document image according to claim 7 wherein said assurance level is compared to a predetermined minimal threshold value.

9. The method of determining a title from a document image according to claim 1 wherein the summation of the points is further determined based upon layout characteristics.

10. The method of determining a title from a document image according to claim 9 wherein said information includes centering, underlining and size, or any combination thereof.

11. The method of determining a title from a document image according to claim 1 wherein the summation of the points is further determined based upon an indication of whether or not said characters end in a noun form.

12. The method of determining a title from a document image according to claim 1 wherein the summation of the points is further determined based upon an indication of whether or not said characters end in a set of predetermined suffixes.

13. The method of determining a title from a document image according to claim 1 wherein the summation of the points is further determined based upon a ratio between a length and a height of each of said circumscribing rectangles.

14. The method of determining a title from a document image according to claim 1 wherein the summation of the points is further determined based upon a ratio between a summed width of said characters and a corresponding one of said circumscribing rectangles.

15. The method of determining a title from a document image according to claim 1 wherein said likelihood is adjusted according to a type of said image documents.

16. The method of determining a title from a document image according to claim 1 wherein said title is combined with a keyword.

17. A system for determining a title from a document image, comprising:
  a character row area determination unit for dividing the document image into minimal circumscribing rectangles which contain a character image;
  a character recognition unit connected to said character row area determination unit for recognizing characters in said minimal circumscribing rectangles; and
  a title evaluation point determination unit connected to said character recognition unit for determining a title of the document image based upon a likelihood of each of said minimal circumscribing rectangles containing a title, said likelihood being determined by a summation of points obtained during said character recognition and said title evaluation, the summation of the points being determined based upon natural language likelihood and any combination of character row area coordinates, character type, number of characters, character code assurance, character minimum circumscribing rectangle coordinates, and character minimum circumscribing rectangle size, the natural language likelihood being determined based upon a comparison to a predetermined title dictionary.

18. The system for determining a title from a document image according to claim 17 wherein said title evaluation point determination unit further comprises a font determination unit for determining font characteristics.

19. The system for determining a title from a document image according to claim 18 wherein said font determination unit determines said font characteristics based on a frequency of a particular font type.

20. The system for determining a title from a document image according to claim 17 wherein said title evaluation point determination unit further comprises a natural language analysis unit for matching said characters with a set of predetermined words, said predetermined words indicating said title.

21. The system for determining a title from a document image according to claim 20 wherein said natural language analysis unit generates a result of matching of said characters with said predetermined words in the predetermined title dictionary.

22. The system for determining a title from a document image according to claim 20 wherein said natural language analysis unit generates an analysis result indicating whether or not said characters end in a noun form.

23. The system for determining a title from a document image according to claim 20 wherein said natural language analysis unit generates an analysis result indicating whether or not said characters end in a set of predetermined suffixes.

24. The system for determining a title from a document image according to claim 17 wherein said title evaluation point determination unit compares said number of said characters to a predetermined maximal threshold number.

25. The system for determining a title from a document image according to claim 17 wherein said character recognition unit generates the summation of the points based on an assurance of said character recognition.

26. The system for determining a title from a document image according to claim 25 wherein said title evaluation point determination unit compares said assurance level to a predetermined minimal threshold value.

27. The system for determining a title from a document image according to claim 17 wherein said title evaluation point determination unit further comprises a characteristics extraction unit for extracting layout characteristics.

28. The system for determining a title from a document image according to claim 27 wherein said extraction unit extracts said layout characteristics on centering, underlining and size, or any combination thereof.

29. The system for determining a title from a document image according to claim 17 wherein said character row area determination unit generates the summation of the points based on a ration between a length and a height of each of said circumscribing rectangles.

30. The system for determining a title from a document image according to claim 17 wherein said character row area determination unit generates the summation of points based on a ratio between a summed width of said characters and a corresponding one of said circumscribing rectangles.

31. The system for determining a title from a document image according to claim 17 wherein said likelihood is adjusted according to a type of said image documents.

32. The system for determining a title from a document image according to claim 17 wherein said title is combined with a keyword.

* * * * *